Unsensitized silver halide emulsion

Silver halide emulsion sensitized with 1·1'-dimethyl-α-anthrathio-cyanine-chloride Silver halide emulsion sensitized with 1·1'-diethyl-acenaphtenthio-6'-methyl-quino-2·4'-cyanine-iodide Silver halide emulsion sensitized with 1·1'-diethyl-α-anthrathio-quino-2·2'-cyanine-iodide Patented Dec. 22, 1936

2,065,412

UNITED STATES PATENT OFFICE 2,065,412

SENSITIZING OF PHOTOGRAPHIC EMULSIONS

Walter Zeh, Dessau in Anhalt, Germany, assignor to Agfa Ansco Corporation, Binghamton, N. Y., a corporation of New York Application September 15, 1932, Serial No. 633,375
In Germany September 19, 1931

7 Claims. (Cl. 95—7)

My present invention relates to sensitizing photographic emulsions.

One of its objects is to provide such an emulsion the sensitiveness of which is raised over the range of wave lengths to which the emulsion is normally sensitive. Further objects will be seen from the detailed specification following hereafter. Reference is made to the accompanying drawing in which there are represented a few spectrograms of the same emulsion sensitized with my sensitizers.

Figure 1:
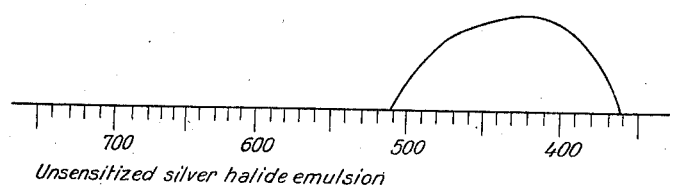
Fig. 1 shows for the sake of comparison the spectrogram of the unsensitized silver halide emulsion used for the tests.
Figure 2:
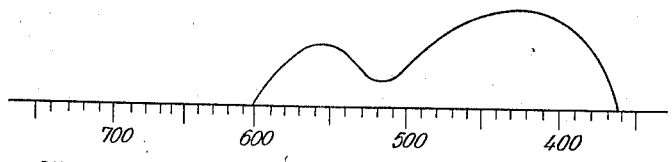
Fig. 2 shows the spectrogram of the silver halide emulsion sensitized with 1.1'-dimethyl-α-anthrathio-cyanine-chloride.
Figure 3:
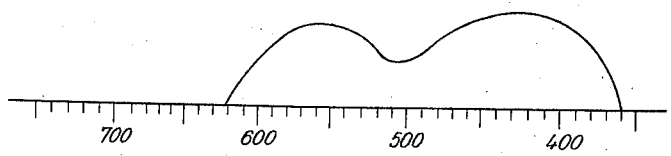
Fig. 3 shows the spectrogram of the silver halide emulsion sensitized with 1.1'-diethyl-acenaphthenethio - 6'- methyl-quino - 2.4'- cyanine-iodide.
Figure 4:
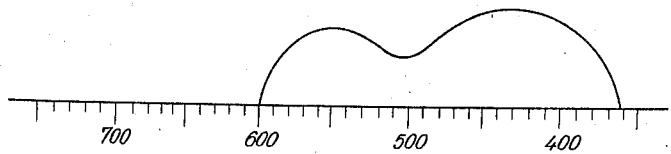
Fig. 4 shows the spectrogram of the silver halide emulsion sensitized with 1.1'-diethyl-α-anthrathioquino-2.2'-cyanine-iodide.

I have found that the thiocyanines, thiopseudocyanines and thioisocyanines derived from thiazole compounds having fused on the thiazolenucleus a system of several condensed rings, are well suited for sensitizing a silver-halide emulsion to wave lengths of about 500μμ to 620μμ.

As a starting material for the new sensitizing dyestuffs there may be used, for instance, the quaternary ammonium salts of the 2-methyl-thiazole of the following nuclear compounds.

Anthracene 

Phenanthrene 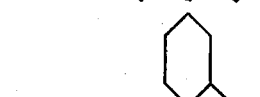

Acenaphthene 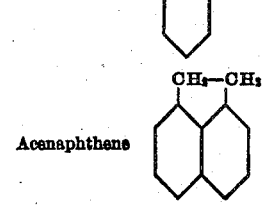

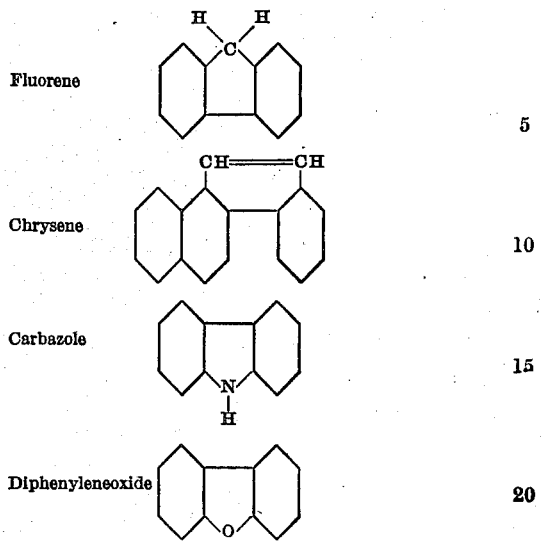

Fluorene

Chrysene

Carbazole

Diphenyleneoxide

The preparation of the 2-methyl thiazoles has been disclosed in the co-pending application Serial Number 621,474, filed July 8, 1932 by Walter Zeh et al. They are produced analogous to known methods from amines of the polynuclear compounds. In order to prepare, for instance, the 2-methylanthrathiazoles, one starts from α- or β-anthramine, and by way of their acetyl- and thio-acet-compound the said 2-methylanthrathiazoles are obtainable by oxidation with potassium ferricyanide. By treating the pseudo-bases with alkyl-halide, dialkyl-sulfate or ethyltoluenesulfonate the quaternary ammonium salts are produced in known manner. These compounds are condensed to sensitizing dyestuffs according to known methods which will more clearly appear from the following examples.

The dyes correspond with the following general formulae:

(1) Thiocyanines

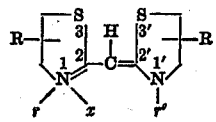

(2) Thiopseudocyanines

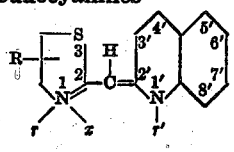

(3) Thioisocyanines

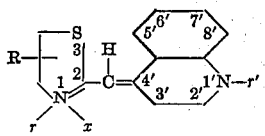

In these formulae R represents, for instance, anthracene, phenanthrane, acenaphthene, fluorene, chrysene, carbazole and diphenyleneoxide. r and r' represent alkyl. X represents any anion suitable for precipitating the dye, for instance, halide, perchlorate, alkylosulfate or paratoluenesulfonate. The dyes may be substituted in the nuclei corresponding to R as well as in the quinoline nucleus.

The anion is selected according to the desired solubility of the dye. The quantity of dye added to the silver-halide emulsion for sensitizing the same amounts to about 10 to 40 milligrams per 1 kg. of emulsion ready for being cast which contains about 9 per cent of gelatin, 4.5 per cent of silver-halide, the rest being water. However, I do not wish to limit my invention to the quantities just indicated, the most suitable amount will in each case be found by a few comparative experiments. The dyes may be added to the emulsion in the form of a solution. Suitable solvents are the alcohols, for instance, methyl or ethyl alcohol which may be used anhydrous or diluted with water. The dyes are applied to the emulsion during any stage of its production, however, they are preferably added to the finished emulsion before being cast. The dyes may likewise be added by coating the emulsion with them or by bathing the finished photographic material in a bath in which the dye is dissolved.

A suitable treatment is as follows: The photographic material to be sensitized is bathed in a solution containing 1 milligram of the sensitizer in 50 cc. of an aqueous solution of methanol of 50 per cent strength for about 5 minutes. Hereafter, the material is dried and is then ready for use.

The dyes are suited for sensitizing an emulsion made according to the boiling process as well as for sensitizing an emulsion made according to the ammonia process.

The following examples serve to illustrate the invention.

*Example 1.*—The dye 1.1'-diethyl-α-anthrathioquino-2.2'-cyanine-iodide corresponding with the formula

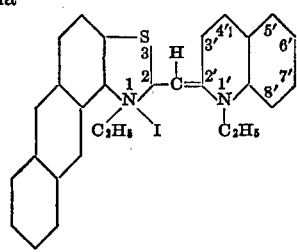

is obtainable by heating 2 grams of 2-methyl-α-anthrathiazole-diethyl-sulphate, 2 grams of 2-iodoquinoline-ethyl-iodide and 20 cc. of alcohol until boiling and adding slowly 4 cc. of an alcoholic solution of sodium ethylate containing about 3 per cent of sodium. The mixture which takes an orange-red color is kept boiling for about 10 minutes. Then, there are added about 10 cc. of an aqueous solution of potassium iodide of about 5 per cent strength whereupon the dye separates in the form of orange-red crystals.

The alcoholic solution of the dye has an absorption maximum at a wave length of about $525\mu\mu$.

Incorporated in a silver bromide emulsion containing about 4 per cent of silver iodide the dye imparts to the emulsion a range of sensitiveness from about 510 to $600\mu\mu$ with a maximum at about $545\mu\mu$.

*Example 2.*—When replacing in Example 1 the 2-methyl-α-anthrathiazole-diethylsulfate by 2-methyl-acenaphthene-thiazole-diethylsulfate the dye 1.1'-diethyl-acenaphthenethioquino-2.2'-cyanine-iodide corresponding with the formula

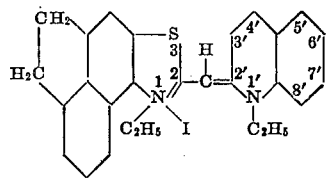

is obtained. The dye crystallizes from alcohol in the form of orange-red needles.

The alcoholic solution of the dye shows an absorption maximum at a wave length of about $525\mu\mu$ to $530\mu\mu$, the maximum being not very marked.

Incorporated in a silver bromide emulsion containing about 4 per cent of silver iodide the dye imparts to the emulsion a range of sensitiveness from about $520\mu\mu$ to $610\mu\mu$ with a maximum at about $555 \mu\mu$.

*Example 3.*—For producing the dye 1.1'-diethyl-diphenyleneoxidethio-6'-methyl-quino-2.2'-cyanine-iodide corresponding with the formula

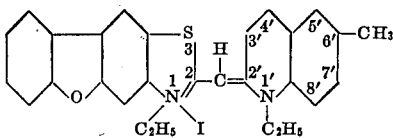

a mixture of 2 grams of 2-methyl-diphenyleneoxidethiazole-diethylsulfate, 2 grams of p-toluquinoline-ethyl-iodide and 20 cc. of alcohol is boiled with 4 cc. of an alcoholic solution of sodium ethylate containing about 3 per cent of sodium, for about 10 minutes. On addition of about 10 cc. of an aqueous solution of potassium iodide of about 5 per cent strength the dye is precipitated in form of orange-red flakes.

The alcoholic solution of the dye has an absorption maximum at a wave length of about $500\mu\mu$.

Incorporated in a silver bromide emulsion containing about 4 per cent of silver iodide the dye imparts to the emulsion a range of sensitiveness from about 500 to $580\mu\mu$ with a maximum at about $538\mu\mu$.

*Example 4.*—When using in Example 3 2-methyl-carbazole-thiazole-diethylsulfate instead of the diphenylene-oxide compound there is obtained 1.1'-diethyl-carbazole-thiazole-6'-methyl-quino-2.2'-cyanine-iodide corresponding with the formula

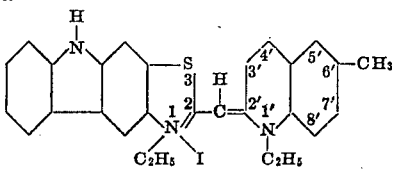

which crystallizes from alcohol in the form of orange-red felted needles.

The alcoholic solution of the dye has an absorption maximum at a wave length of about 510μμ.

In corporated in a silver bromide emulsion containing about 4 per cent of silver iodide the dye imparts to the emulsion a range of sensitiveness from about 510 to 600μμ with a maximum at about 550μμ.

*Example 5.*—For producing the dye 1-methyl-1'-ethyl-α-anthrathioquino-2.4'-cyanine-bromide corresponding with the formula

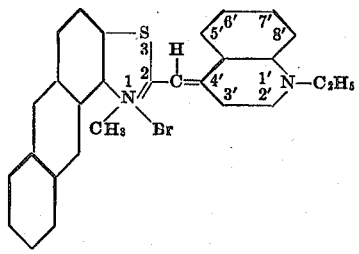

2 grams of 2-methyl-α-anthrathiazole-dimethyl-sulfate, 1.5 grams of quinoline-ethyl-bromide and 20 cc. of alcohol are heated until dissolution is complete. Hereon there are added 5 cc. of an alcoholic solution of sodium ethylate containing about 3 per cent of sodium. The mixture is boiled for a short time and takes immediately a red color. The dye separates in the form of red flakes.

The alcoholic solution of the dye has an absorption maximum at a wave length of about 545μμ.

Incorporated in a silver bromide emulsion containing about 4 per cent of silver iodide the dye imparts to the emulsion a range of sensitiveness from about 520 to 630μμ with a maximum at about 565μμ.

*Example 6.*—The dye 1.1'-diethyl-acenaphthenethio-6'-methyl-quino-2.4'-cyanine-iodide corresponding with the formula

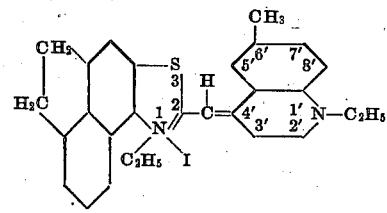

is obtainable by heating a mixture of 2-methyl-acenaphthenethiazole-diethyl-sulfate, 1.8 grams of p-toluquinoline-ethyl-iodide and 20 cc. of alcohol until dissolution is complete. To the mixture there are added 5 cc. of an alcoholic solution of sodium ethylate containing about 3 per cent of sodium and heating is continued for a short time. After addition of a few cc. of an aqueous solution of potassium iodide of about 5 per cent strength the dye separates in the form of red flakes. By recrystallization from alcohol the dye is obtained in the form of orange-red needles.

The alcoholic solution of the dye has an absorption maximum at a wave length of about 535μμ.

Incorporated in a silver bromide emulsion containing about 4 per cent of silver iodide the dye imparts to the emulsion a range of sensitiveness from about 520 to 620μμ with a maximum at about 555μμ.

*Example 7.*—The dye 1.1'-diethyl-carbazolethio-6'-methoxy-quino-2.4'-cyanine-iodide corresponding with the formula

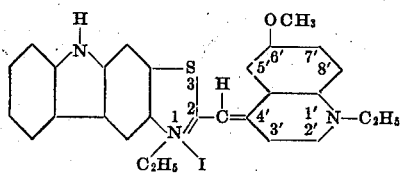

separates after heating for a short time a solution of 2 grams of 2-methyl-carbazolethiazole-diethyl-sulfate and 2 grams of p-methoxy-quinoline-ethyl-iodide in 20 cc. of alcohol to which 5 cc. of an alcoholic solution of sodium ethylate containing about 3 per cent of sodium have been added, in the form of red flakes which can be recrystallized from alcohol.

The alcoholic solution of the dye has an absorption maximum at a wave length of about 545μμ.

Incorporated in a silver bromide emulsion containing about 4 per cent of silver iodide the dye imparts to the emulsion a range of sensitiveness from about 530 to 620μμ with a maximum at about 565μμ.

*Example 8.*—The dye 1.1'-dimethyl-α-anthrathiocyanine-chloride corresponding with the formula

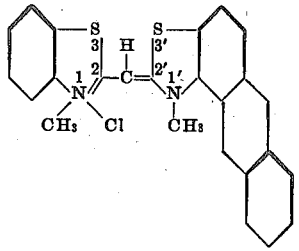

is prepared as follows. To a boiling solution of 4 grams of 2-methyl-α-anthrathiazole-methyl-chloride in 20 cc. of acetic anhydride there is added a mixture of 1 cc. of amyl nitrite and 5 cc. of acetic anhydride. While vigorously frothing the mixture takes a brown-red color. After cooling the dye separates in a poor yield.

The alcoholic solution of the dye has an absorption maximum at a wave length of about 540μμ.

Incorporated in a silver bromide emulsion containing about 4 per cent of silver iodide the dye imparts to the emulsion a range of sensitiveness from about 520 to 600μμ with a maximum at about 560μμ.

My invention is not limited to the foregoing examples nor to the specific details given therein. Numerous other embodiments are possible and I contemplate as included within my invention all such modifications and equivalents as fall within the scope of the appended claims. So, for instance, the nuclei may contain one or more substituents. The nomenclature used is arbitrary, but it is familiar to every chemist skilled in the art and has the advantage of clearness. In the case of the dyes, numbering is begun from the N atom of the 5 ring and in the case of the bases, numbering is begun from S of the 5 ring. The formulae of the dyes as given herein represent the molecular structure of my new dyes so far as known. If, however, in future it should become evident that the formulae do not exactly correspond to the dyes this fact will not affect my invention since the dyes will be easily identified by the method of producing the same which has been fully described in the examples and is analogous to known methods.

What I claim is:

1. A photographic silver halide emulsion containing a dye selected from the group consisting of thiocyanines, thiopseudocyanines and thioisocyanines having fused on the two carbon atoms between the sulfur atom and the nitrogen atom of the thiazole nucleus a nuclear component selected from the group consisting of anthracene, phenanthrene, fluorene, chrysene and acenaphthene.

2. A photographic silver halide emulsion containing an anthrathiocyanine.

3. A photographic silver halide emulsion containing an anthrathiopseudocyanine.

4. A photographic silver halide emulsion containing an acenaphtheneisocyanine.

5. A photographic silver-halide emulsion containing 1.1'-dimethyl-α-anthrathiocyanine-chloride.

6. A photographic silver-halide emulsion containing 1.1'-diethyl-acenaphthenethio-6'-methyl-quino-2.4'-cyanine-iodide.

7. A photographic silver-halide emulsion containing 1.1'-diethyl-α-anthrathioquino-2.2'-cyanine-iodide.

WALTER ZEH.